US012409942B2

(12) United States Patent
Medici et al.

(10) Patent No.: US 12,409,942 B2
(45) Date of Patent: Sep. 9, 2025

(54) METHOD FOR CONTROLLING AN AIRCRAFT CAPABLE OF HOVERING AND RELATIVE AIRCRAFT

(71) Applicant: LEONARDO S.P.A., Rome (IT)

(72) Inventors: Luca Medici, Samarate (IT); Fabio Nannoni, Samarate (IT); Marco Braghiroli, Samarate (IT); Andrea Cogliati, Samarate (IT); Tiziano Frattini, Samarate (IT); Lorenzo Masellis, Samarate (IT); Luca Riviello, Samarate (IT); Alessandro Scola, Samarate (IT); Marco Tamborini, Samarate (IT); Matteo Pizzagalli, Samarate (IT)

(73) Assignee: LEONARDO S.P.A., Rome (IT)

( * ) Notice: Subject to any disclaimer, the term of this patent is extended or adjusted under 35 U.S.C. 154(b) by 275 days.

(21) Appl. No.: 18/018,961

(22) PCT Filed: Jul. 30, 2021

(86) PCT No.: PCT/IB2021/056978
§ 371 (c)(1),
(2) Date: Jan. 31, 2023

(87) PCT Pub. No.: WO2022/029581
PCT Pub. Date: Feb. 10, 2022

(65) Prior Publication Data
US 2023/0322400 A1 Oct. 12, 2023

(30) Foreign Application Priority Data
Aug. 4, 2020 (EP) .................................... 20189398

(51) Int. Cl.
*B64D 31/10* (2006.01)
*B64D 35/08* (2025.01)
*G05D 1/00* (2024.01)

(52) U.S. Cl.
CPC ........... *B64D 35/08* (2013.01); *G05D 1/0072* (2013.01)

(58) Field of Classification Search
CPC ......... B64D 35/08; G05D 1/0072; F02C 6/02; F02C 3/113; F02C 7/36; F05D 2220/329;
(Continued)

(56) References Cited

U.S. PATENT DOCUMENTS 10,487,733 B2    11/2019   Morgan
2013/0219905 A1*  8/2013   Marconi ................. F02C 7/268
                                                        60/39.12
(Continued)

FOREIGN PATENT DOCUMENTS

CN    105593493 A    5/2016
CN    110821677 A    2/2020
(Continued)

OTHER PUBLICATIONS

International Search Report and Written Opinion in corresponding International Patent Application No. PCT/IB2021/056978, mailed Oct. 14, 2021 (18 pages).
(Continued)

*Primary Examiner* — Nga X Nguyen
(74) *Attorney, Agent, or Firm* — Leason Ellis LLP

(57) ABSTRACT

A method for controlling an aircraft capable of hovering is described, comprising a first engine; a second engine; at least one rotor; and a transmission interposed between the first and second engine and the rotor; the transmission comprises a first and a second inlet connected respectively to a first outlet member of the first engine and to a second
(Continued)

outlet member of the second engine; the method comprises step i) of placing the in a first configuration, in which the first and second engine make available a first and a second power value; or in a second configuration, in which the first engine makes available a third power value greater than the first power value to the first inlet, and the second engine delivers a nil power value to the second inlet; the method also comprises, characterised in that it comprises the steps of ii) detecting a series of parameters associated with the operating conditions of the aircraft; and iii) enabling the transition of the aircraft from the first configuration to the second configuration, when the parameters assume respective first values.

12 Claims, 9 Drawing Sheets

(58) Field of Classification Search
CPC . F05D 2270/093; F05D 2270/13; G06T 7/73; G06T 2207/20081; G06T 2207/20092; G06F 3/013; G06F 3/167; G06V 10/70; G06V 10/945; G06V 20/50; G06V 20/70; G10L 15/1815; G10L 15/22; G10L 15/26
See application file for complete search history.

(56) References Cited

U.S. PATENT DOCUMENTS

| | | |
|---|---|---|
| 2015/0176488 A1 | 6/2015 | Borchers et al. |
| 2016/0237917 A1 | 8/2016 | Marconi et al. |
| 2017/0327241 A1 | 11/2017 | Mitrovic et al. |
| 2018/0065736 A1* | 3/2018 | Sebesta ................ B64C 15/02 |
| 2020/0049025 A1* | 2/2020 | Morgan ................ F02C 6/02 |
| 2020/0362754 A1 | 11/2020 | Beauchesne-Martel et al. |

FOREIGN PATENT DOCUMENTS

| | | |
|---|---|---|
| EP | 2886456 | 6/2015 |
| EP | 3738874 | 11/2020 |

OTHER PUBLICATIONS

Written Opinion in corresponding International Patent Application No. PCT/IB2021/056978, mailed Jan. 27, 2022 (7 pages).
International Preliminary Report on Patentability in corresponding International Patent Application No. PCT/IB2021/056978, mailed Oct. 28, 2022 (8 pages).
Chinese Office Action in CN Application No. 202180057002.2, mailed Mar. 22, 2025, an English Translation attached hereto (10 pages).

* cited by examiner

FIG. 3

| CONDITIONS FOR ACR | MIN | MAX | ENTRY (allowed if condition is true) | EXIT (if condition not true) |
|---|---|---|---|---|
| min < OAT < max | design min | design max | Y | Y |
| min < pressure altitude < max | design min | design max | Y | Y |
| height AGL > min | 50 to 1000 ft | NA | Y | Y |
| height ASL > min | between 50 and 1000 ft | NA | Y | Y |
| min < rotor speed < max | 0.85 to 1.0 of the ref. speed | 1.0 to 1.15 of the ref. speed | Y | Y |
| min < IAS < max | between 0.5 and 1.5 of the min power speed in level flight | between 1.0 and 2.5 of the min power speed in level flight | Y | Y |
| min < rate of climb < max | between 0.1 and 1.0 of the autorotation (zero power) vertical speed | between 0.1 and 1.0 of the maximum rate of climb at min power speed | Y | Y |
| min < engine torque < max | between 0.5 and 1.0 of the TQ necessary for straight level flight at min power speed | between 1.0 and 3.0 of the TQ necessary for straight level flight at min power speed | Y | Y |
| min < density altitude < max | design min | design max | Y | Y |

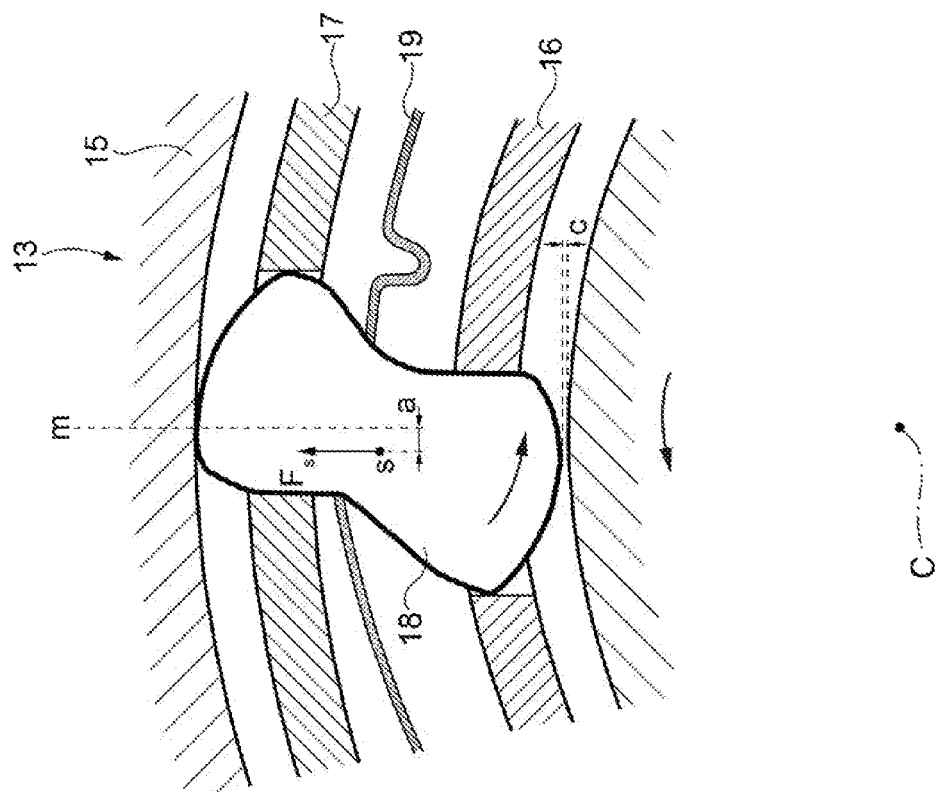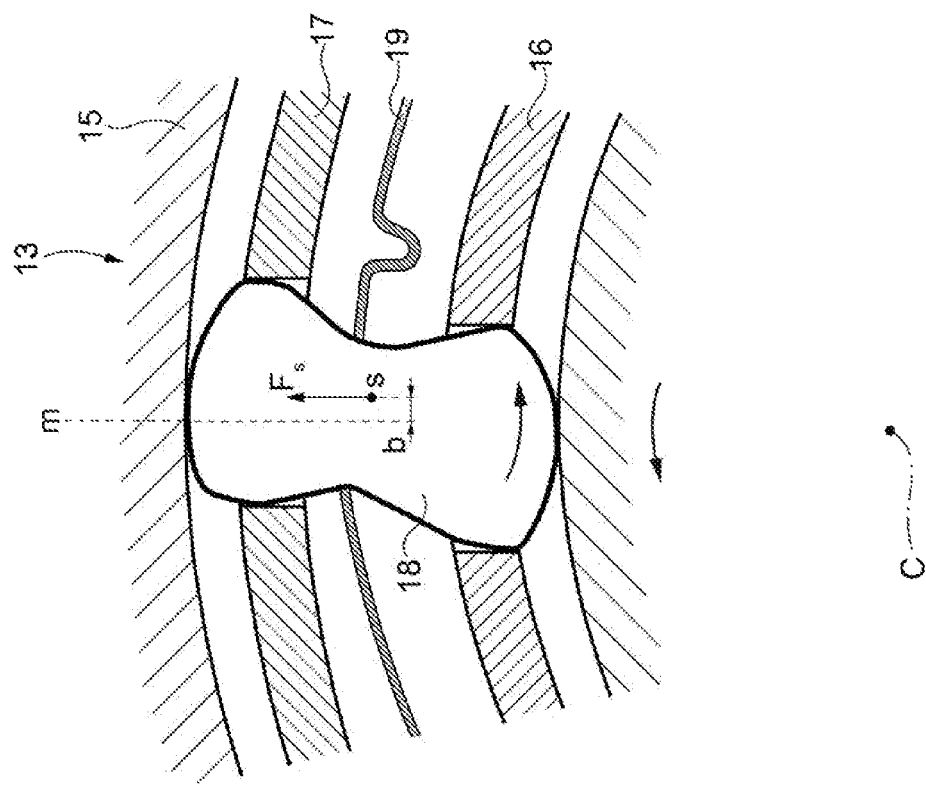
FIG. 8

METHOD FOR CONTROLLING AN AIRCRAFT CAPABLE OF HOVERING AND RELATIVE AIRCRAFT

CROSS-REFERENCE TO RELATED APPLICATIONS

This Patent Application is a U.S. National Phase Application under 35 U.S.C. § 371 of International Patent Application No. PCT/IB2021/056978, filed on Jul. 30, 2021, which claims priority from European Patent Application No. 20189398.9 filed on Aug. 4, 2020, all of which are incorporated by reference, as if expressly set forth in their respective entireties.

TECHNICAL FIELD

The present invention relates to a method for controlling an aircraft capable of hovering and to the aircraft itself.

In more detail, the aircraft is a helicopter or a convertiplane.

BACKGROUND ART

Helicopters in a known manner essentially comprise a fuselage, a main rotor rotatable around a first axis and arranged on a top portion of the fuselage, and an anti-torque rotor arranged at a tail end of the helicopter and rotatable around a second axis, transverse to the first axis.

The helicopters of the known type also comprise an engine system and a transmission unit for transmitting the motion from an outlet shaft of the engine system to the main rotor.

In multi-engine solutions, the engine system comprises at least one pair of engines, more precisely turbo-shaft engines, which are provided with respective outlet shafts connected to the transmission.

At least in twin-engine helicopters, each "turbo-shaft" engine is oversized to ensure the necessary power in case of failure of the other turbo-shaft engine.

Consequently, each turbo-shaft engine is capable of delivering a maximum power greater than that needed by the helicopter when both turbo-shaft engines are in operation.

Said oversizing is suboptimal in terms of weight and fuel consumption of the turbo-shaft engines.

In fact, at cruise speed in forward flight, the turbo-shaft engines deliver respective power levels approximately comprised between a value of 55% and a value of 80% of such maximum power value.

At these power levels, the engine efficiency is much lower than the efficiency at power levels close to 100%, with higher specific fuel consumption.

In other words, in general the efficiency of a turbo-shaft engine that operates at a level equal to 60% of the maximum deliverable power has a higher specific fuel consumption than when it delivers the maximum power.

This implies that, generally, on a helicopter, turbo-shaft engines have a suboptimal specific fuel consumption at cruise speed.

In order to reduce specific fuel consumption in cruise conditions, it was proposed to stop one of the turbo-shaft engines and use the remaining engines for flying. In this way, the one or the only turbo-shaft engines remaining in operation deliver more power than it would be delivered if all the turbo-shaft engines were working and can thus operate with respective lower specific fuel consumption.

However, such a flight mode with a stopped turbo-shaft engine is only possible under determined operating conditions of the helicopter.

The sector also feels the need to promptly identify whether the helicopter is satisfying the aforesaid operating conditions.

Furthermore, the sector feels the need to prevent this flight mode and to facilitate quitting this flight mode with a stopped turbo-shaft engine, if the helicopter is outside these operating conditions.

The sector also feels the need to promptly indicate to the pilot the correct operations to carry out to bring the helicopter back within these operating conditions, in the event that the aforesaid flight mode is required when the helicopter does not satisfy these operating conditions.

The sector also feels the need to continuously verify whether the helicopter is at risk of quitting these operating conditions if the aforesaid flight mode has been requested and to promptly warn the pilot of such risk.

Finally, the need is felt to make said flight mode possible with a stopped turbo-shaft engine, while preserving as much as possible the coupling normally existing between the turbo-shaft engines and the transmission. This is in order to be able to implement this flight mode on already existing helicopters, without having to redesign said coupling.

As an example, document US-A-2016/0237917 describes a method for optimizing the specific fuel consumption of a twin-engine helicopter. The method involves actuating one of the turbo-shaft engines at a speed indicated as "stabilised flight speed" and the other one at a speed indicated as "super-idle at zero power". In particular, in the "super-idle at zero power" condition, the turbo-shaft engine has the combustion chamber of the gas generator on while trying to keep a speed at minimum regime in order to reduce the operating temperature and fuel consumption of said gas generator.

US-A-2013/0219905 describes a method for reducing the specific fuel consumption of a helicopter, in which one of the turbo-shaft engines operates at a speed indicated as "stabilised flight speed" and the other one operates at a speed indicated as "over-idle nil power speed".

U.S. Pat. No. 10,487,733 B describes a method for controlling a twin-engine helicopter, in which, in cruise conditions, one of the turbo-shaft engines provides the required power while the other one is kept in a so-called "idling" state by using electrical power generated by converting the mechanical energy provided by a "power spool" of the first turbo-shaft.

US-A-2020/049025 discloses a method for controlling an aircraft according to the preamble of claim 1 and a method for controlling the aircraft according to the preamble of claim 12.

EP-A-2886456 discloses a method of managing a power plant for a rotary wing aircraft, comprising two main engines, a secondary engine, and a main power transmission gearbox. The main and secondary engines mechanically drive the main power transmission gearbox, so as to rotate a main rotor of the aircraft. The secondary engine delivers two distinct mechanical power levels so that the main and secondary engines together deliver sufficient mechanical power to enable the aircraft to fly, firstly a first secondary mechanical power MPS1 and secondly a second secondary mechanical power MPS2 suitable for compensating for a loss of main mechanical power from at least one main engine.

DISCLOSURE OF INVENTION

The object of the present invention is to realise an aircraft capable of hovering, which allows the aforesaid need to be satisfied in a simple and economical way.

According to the invention, the aforesaid object is achieved by a method for controlling an aircraft according to claim 1.

The present invention also relates to an aircraft capable of hovering according to claim 12.

BRIEF DESCRIPTION OF THE DRAWINGS

An embodiment is described below for a better understanding of the present invention, provided by way of non-limiting example with reference to the accompanying drawings, wherein:

FIG. 3 is a table illustrating some parameters significant of the method of FIG. 2;

FIG. 8 schematically illustrates in section some details of the engine system of FIG. 7.

BEST MODE FOR CARRYING OUT THE INVENTION

Figure 1:
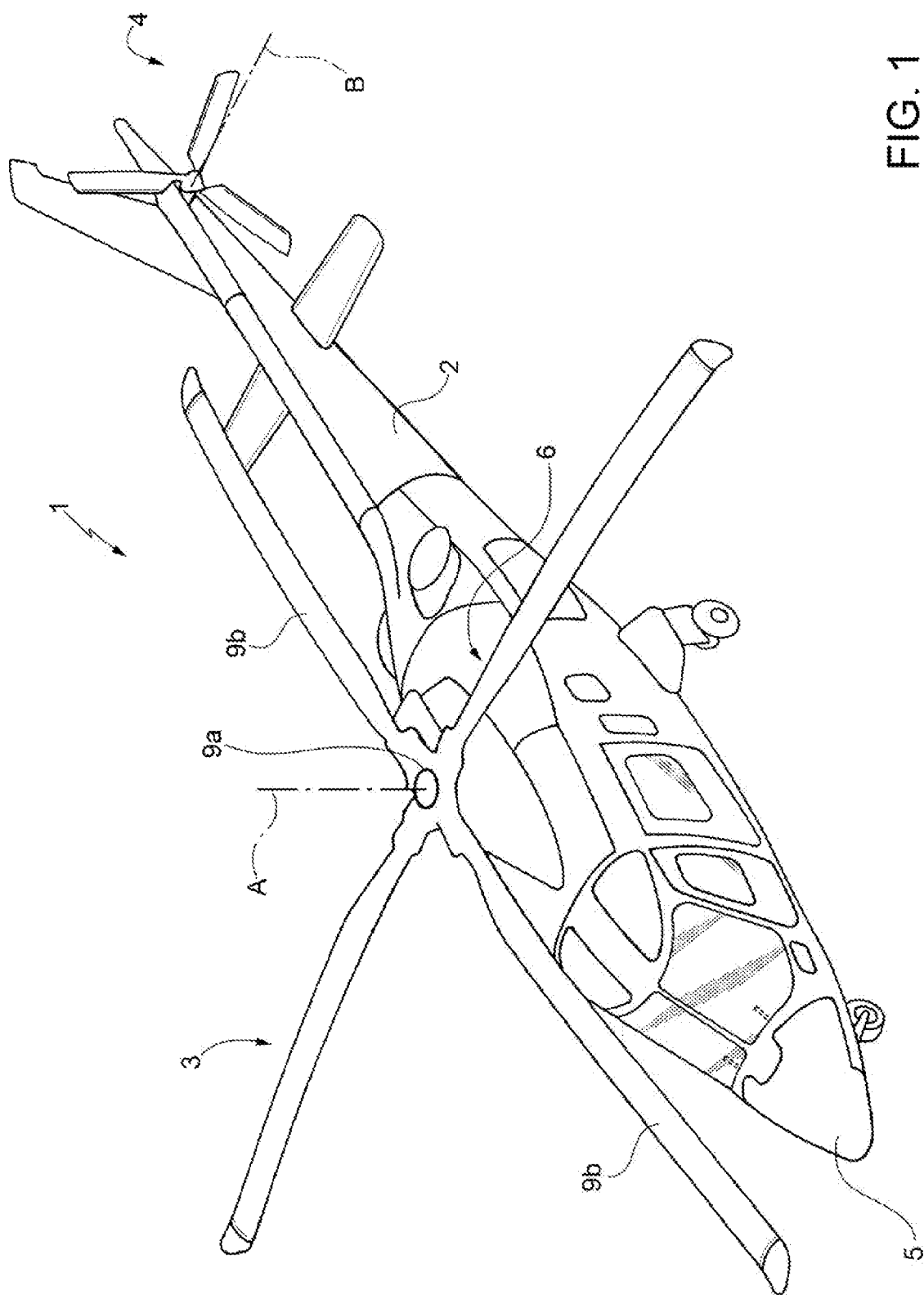
FIG. 1 illustrates a perspective view of a twin-engine helicopter realised according to the dictates of the present invention.

With reference to FIG. 1, 1 indicates a helicopter essentially comprising a fuselage 2 provided with a front nose 5, a main rotor 3 placed at a top of the fuselage 2 and rotatable around an axis A, and a tail rotor 4 carried by a drift protruding from the fuselage 2 on the opposite side of the nose 5 and rotating around an axis B transverse to axis A.

In greater detail, the rotor 3 comprises a hub 9a of axis A and on which a plurality of blades 9b are constrained in a cantilever manner, which extend radially to axis A.

The blades 9b are articulated on the hub 9a so as to be able to vary their orientation with respect to the relative extension axes, so as to adjust the respective pitch angles with respect to the air current.

It should be noted that in the remainder of this description, expressions such as "above", "below", "front", "rear" and the like are used with reference to forward flight or "hovering" conditions of the helicopter 1 illustrated in FIG. 1 and in which the main rotor 3 is arranged above the fuselage 2 and the nose 5 in front of the tail rotor 4.

Figure 9:
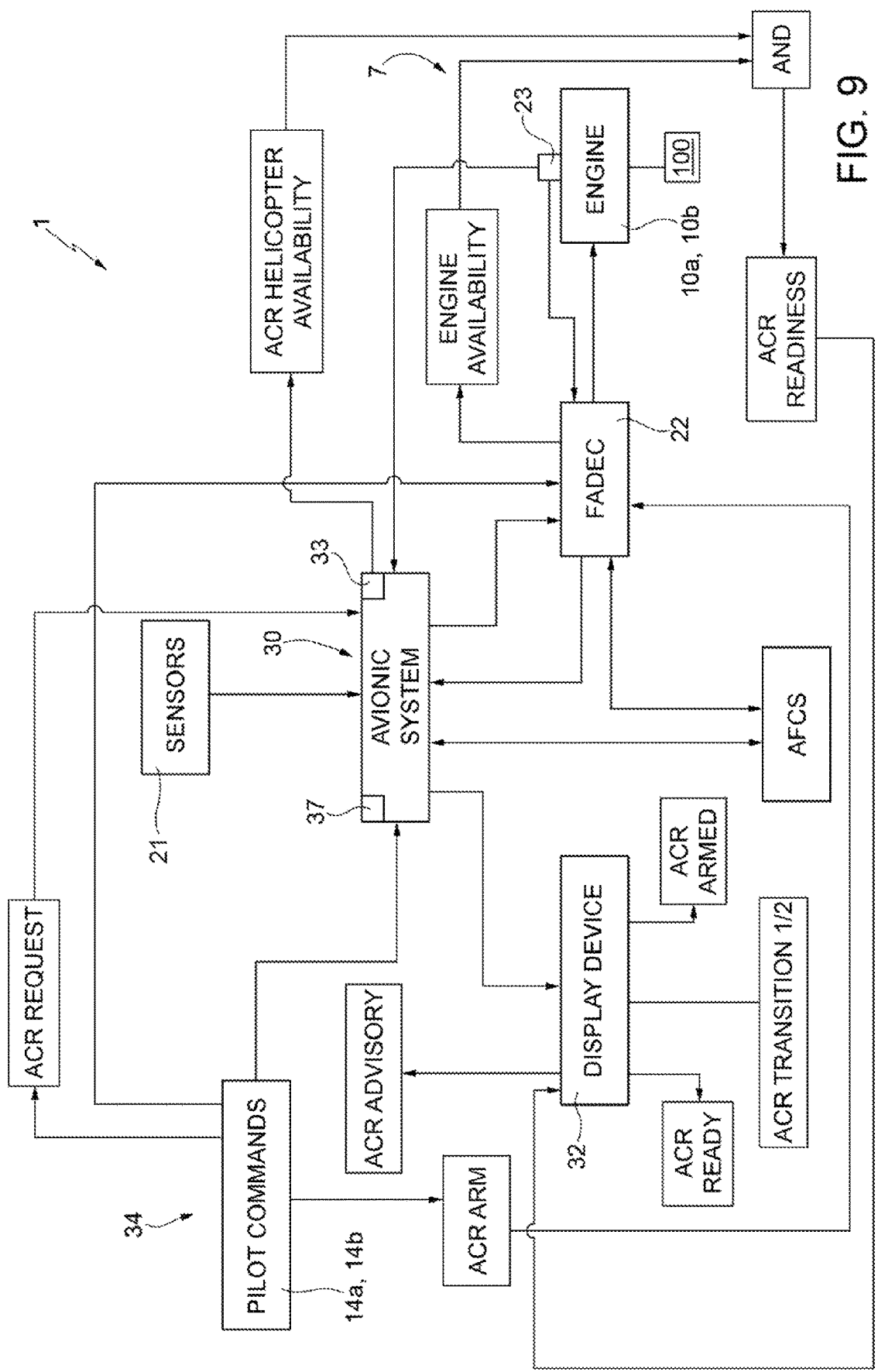
FIG. 9 is a functional diagram of some components of the helicopter of FIGS. 1 to 8.

The helicopter 1 also comprises:
a flight control 14a (only schematically illustrated in FIG. 9) which can be actuated by the pilot and known as a "collective pitch" and which can be actuated to collectively vary the pitch angles of the blades 9b, thus causing an increase or a reduction in the lift generated by the helicopter 1; and
a flight control 14b (also only schematically illustrated in FIG. 9) which can be actuated by the pilot and known as "cyclic pitch" and which can be actuated to cyclically vary the pitch angle of the blades 9b according to their relative positions with respect to axis A.

The helicopter 1 also comprises (FIG. 7):
an engine system 7 adapted to actuate the main rotor 3 and the tail rotor 4; and
a transmission 8 receiving the motion from the engine system 7 and configured to provide mechanical power in output at suitable rotation speeds to a drive shaft of the main rotor 3 and to a drive shaft of the tail rotor 4.

The engine system 7 comprises, in turn, a pair of engines 10a, 10b.

In the case illustrated, the engines 10a, 10b are of the turbo-shaft type, of a known type and described below only to the extent necessary for the present invention.

In greater detail, each engine 10a, 10b behaves like a gas turbine system carrying out an open Joule-Brayton thermodynamic cycle.

Each engine 10a, 10b comprises a relative outlet shaft 11a, 11b rotatable around a relative axis C.

Each engine 10a, 10b essentially comprises:
an air intake (not illustrated) obtained in a side of the fuselage 2;
a compressor (not illustrated) supplied by the air intake with a fresh air flow rate and adapted to compress said air flow rate;
a combustion chamber (not illustrated), in which the air flow rate compressed by the compressor reacts with a fuel flow rate generating a high temperature exhaust gas flow rate; and
a pair of turbines (only schematically illustrated), inside which the flow rate of high-temperature exhaust gases leaving the combustion chamber expands, driving the compressor and the relative outlet shaft 11a, 11b in rotation around the relative axis C.

Each regime of the engine 10a, 10b corresponds to respective values of specific fuel consumption, rotation speed of the relative outlet shaft 11a, 11b around the axis C and power made available to the relative outlet shaft 11a, 11b itself.

Figure 7:
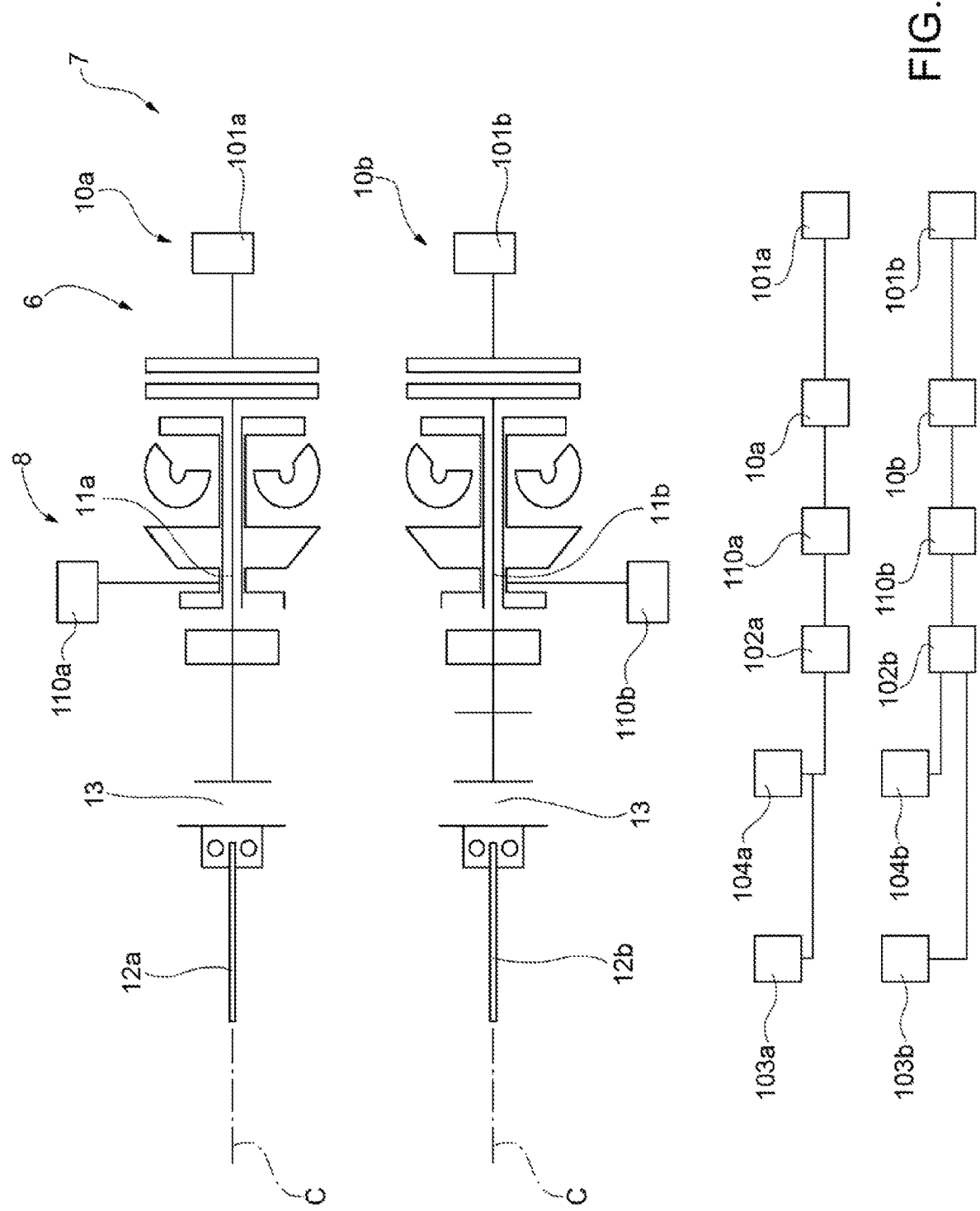
FIG. 7 is a functional diagram of some components of the engine system of the helicopter of FIG. 1.

With reference to FIG. 7, the outlet shaft 11a, 11b of each engine 10a, 10b is connected to a respective inlet shaft 12a, 12b of the transmission 8 by means of a relative free wheel 13.

The free wheel 13 of each engine 10a, 10b is provided to allow the rotation of the relative inlet shaft 12a, 12b of the transmission 8 in the event of the relative outlet shaft 11a, 11b stopping.

In other words, the free wheels 13 allow to preserve the operation of the transmission 8 and, therefore, of the main rotor 3 and of the tail rotor 4 thanks to the power delivered by the other engine 10a, 10b in case of failure of one of the engines 10a, 10b or in autorotation in case of failure of both engines 10a, 10b.

With reference to FIG. 8, each free wheel 13 essentially comprises:

a wheel 15 radially external to the axis C and operatively connected to the respective outlet shaft 11a, 11b;

a wheel 16 radially internal with respect to the axis C and connected to the relative inlet shaft 12a, 12b; and a wheel 17 radially intermediate between the wheels 15, 16.

The wheel 17 of each free wheel 13 comprises, in turn, a plurality of relative angularly spaced stop teeth 18 (only one of which is illustrated in FIG. 8) and a relative spring 19 which elastically locks the relative teeth 18.

When power is applied to the outlet shaft 11a, 11b of each engine 10a, 10b, the wheel 15 of the relative free wheel 13 drives the relative wheel 16 and the relative inlet shaft 12a, 12b in rotation.

In the case in which the assembly formed by the wheel 16 and by the relative inlet shaft 12a, 12b of the transmission 8 rotates at a rotation speed greater than the rotation speed of the relative outlet shaft 11a, 11b—as it occurs, for example, in case of engine sudden stoppage—the relative free wheel 13 allows the disengagement of the relative inlet shaft 12a, 12b from the corresponding outlet shaft 11a, 11b.

The helicopter 1 also comprises (FIG. 9):

a plurality of sensors 21 adapted to provide respective measurements of respective flight parameters and indications relating to the state of correct operation/failure of the systems and equipment of the helicopter 1 not forming part of the engine system 7;

a digital control system of the engine system 7 referred to hereinafter as FADEC 22;

a plurality of sensors 23 arranged inside the engine system 7 and adapted to provide a measurement of the angular speed of the engine system 7 itself; and an avionic system 30.

The sensors 21 are configured to measure at least the following parameters: the external temperature OAT; the pressure altitude; the height above ground level; the height above sea level; the indicated speed IAS; the density altitude; the altitude above the minimum flight level and the variometric speed; the attitude of the helicopter 1 and the position of the helicopter 1.

The avionic system 30 is programmed to:

make at least some of the parameters of the sensors 21 available to the FADEC 22; and acquire significant parameters of the behaviour of the engines 10a, 10b and of the commands imposed by the pilot on the main rotor 3 and tail 4 rotor.

The FADEC 22 is programmed to process, on the basis of the aforesaid parameters, a control law for the engines 10a, 10b in terms of fuel flow rate made available to the respective combustion chambers.

More precisely, the FADEC 22 processes the control law for the engines 10a, 10b independently of the avionic system 30.

The helicopter 1 has a first operating configuration, hereinafter referred to as the nominal operating configuration, in which (FIG. 4), the engines 10a, 10b make available respective power values P1, P2 substantially equal to each other to the respective outlet shafts 11a, 11b.

The sum of the powers P1 and P2 is equivalent to the power P necessary for the correct operation of the main 3 and tail 4 rotors.

The helicopter 1 has a second operating configuration, hereinafter referred to as the ACR operating configuration, i.e. Asymmetric Cruise Regime, in which (FIGS. 5 and 6) the engines 10a, 10b make available respective power values P3, P4 different from each other to the respective outlet shafts 11a, 11b.

In particular, the power P4 is nil while the power P3 is greater than the power P1 and equal to the power P.

Preferably, in the ACR mode, the consumption of the engine 10b is minimal.

In other words, the engine 10b is not turned off in the ACR mode, but drives the outlet shaft 11b in rotation without delivering engine power to the outlet shaft 11b itself.

The avionic system 30 is operationally connected with the sensors 21, 23 and with the flight controls 14a, 14b, and is interfaced with the FADEC 22.

The avionic system 30 is also configured to continuously monitor the operating conditions of the helicopter 1 and to command, automatically or following a command given by the crew, to the FADEC 22 to place the helicopter 1 in the operating configuration or in the ACR configuration.

For this purpose, the avionic system 30 essentially comprises:

an instrumentation 31 configured to provide the pilot with indications relating to the operating parameters of the helicopter 1 itself;

a display device 32 (for example known as CDS) of a series of messages for the crew;

a control unit 33, also known as the "Aircraft Management System—AMS"; and an interface 34 which can be actuated by the crew to command the transition of the helicopter 1 from the nominal configuration to the ACR configuration and vice versa.

The avionic system 30 further comprises a memory stage 37.

In greater detail, the interface 34 comprises (FIG. 2):

an ACR REQUEST command that can be actuated by the crew and can be moved between an enabled position, in which the transition from the nominal operating mode to the ACR operating mode is requested, and a disabled position, in which the transition from the ACR operating mode to the nominal operating mode is requested; and an ACR ARM command which can be actuated by the crew.

In greater detail, the ACR ARM command is a monostable command, of the "momentary pushbutton" type in the case illustrated.

If the helicopter 1 is in the ACR configuration, the actuation of the ACR ARM command produces the emergency exit manoeuvre of the helicopter 1 from the aforesaid ACR configuration, as will become clear from the remainder of this description.

If helicopter 1 is in the nominal configuration, the sequential actuation of the ACR ARM and ACR REQUEST commands will produce the request of entry of the helicopter 1 into the ACR configuration.

More specifically, the ACR ARM command is intended to prevent the ACR REQUEST command from accidentally causing the transition to the ACR configuration.

In the case illustrated, the ACR ARM command is arranged on the flight control 14a of the collective pitch.

The avionic system 30 is programmed to produce a variation in the state of the FADEC 22, following the actuation of the ACR ARM and ACR REQUEST commands.

The FADEC 22 also confirms the receipt of the command and the consequent change of state.

The helicopter 1 also comprises an electrical power generation and distribution system 100 (FIG. 7) also known as EPGDS (Electrical Power Generation and Distribution System).

The system 100 essentially comprises, for each engine 10a, 10b, a starter 101a, 101b adapted to produce the start of the engine 10a, 10b itself and an electric current generator 102a, 102b actuated by the engine 10a, 10b itself.

In the case illustrated, the generators 102a, 102b are connected to respective auxiliary transmissions 110a, 110b of the respective engines 10a, 10b. The auxiliary transmissions 110a, 110b are connected to the respective engines 10a, 10b in parallel to the respective shafts 12a, 12b of the transmission 8.

The system 100 further comprises, for each engine 10a, 10b:
- a unit 103a, 103b known as REPU (Remote Electrical Power Distribution) for the distribution of electrical power to the primary loads essential for the operability of the helicopter 1; and
- a unit 104a, 104b for the distribution of electrical power to the secondary loads not essential for the operability of the helicopter 1

When the helicopter 1 is in the nominal operating configuration, the generators 102a, 102b are both active and electrically supply the units 103a, 104a; 103b, 104b, respectively.

When the helicopter 1 is in the ACR operating configuration, the electrical system 100 is reconfigured so that the generator 102b connected to the engine 10b is deactivated and only the electrical loads essential to the operability of the helicopter 1 are supplied only by the generator 102a actuated by the engine 10a.

Preferably, the non-essential secondary loads of the unit 104b are partly supplied by the generator 102a.

Otherwise, the unit 104b is disabled.

The display device 32 is programmed to display:
- an ACR READY signal representative of the fact that the helicopter 1 is in the conditions to operate in the ACR operating configuration;
- an ACR ARMED signal representative of the fact that the ACR ARM command is in the enabled position;
- a 1(2) ACR TRANSITION signal representative of the fact that the ACR REQUEST command has been moved to the enabled position and the avionic system 30 is proceeding with the reconfiguration of the electrical system 100; and
- an ACR signal representative of the fact that the ACR REQUEST command has been moved to the enabled position, the electrical system 100 has been reconfigured, and the FADEC 22 is proceeding with the reconfiguration of the engines 10a, 10b.

The transition from the nominal configuration to the ACR configuration of the helicopter 1 can be activated alternatively on one of the engines 10a, 10b.

The control unit 33 of the avionic system 30 is programmed to detect a series of parameters associated with the operating conditions of the helicopter 1, and to enable the transition of the helicopter 1 from the nominal configuration to the ACR configuration, when said parameters assume respective first values.

The term "operating conditions" in the remainder of this description means both the first operating flight parameters of the helicopter 1 and the second parameters representative of the operating conditions of the systems and equipment of the helicopter 1 essential for the correct operation of the helicopter 1 itself.

In greater detail (FIGS. 2 and 9), the avionic system 30 is programmed to attribute a TRUE or FALSE value to an "ACR Helicopter Availability" parameter, based on the first parameters detected by the sensors 21, and on the content of the memory stage 37.

In particular, the avionic system 30 is programmed to attribute the TRUE value to an "ACR Helicopter Availability" parameter when the helicopter 1, with the exception of the engine system 7, is in a condition to be operated in ACR configuration. Otherwise, the avionic system 30 is programmed to attribute the FALSE value to the "ACR Helicopter Availability" parameter.

The FADEC 22 is also programmed to evaluate whether the engine system 7 is in a condition to operate in ACR configuration or not.

In greater detail, the FADEC 22 is configured to attribute TRUE value to an "Engine Availability" parameter if the engine system 7 is in a condition to operate in ACR configuration. Otherwise, the FADEC 22 is programmed to attribute FALSE value to the aforesaid "Engine Availability" parameter.

The FADEC 22 is also configured to attribute TRUE value to an "ACR Readiness" parameter to the avionic system 30, when both the "Engine Availability" and "ACR Helicopter Availability" signals assume TRUE value.

Alternatively, the avionic system 30 is configured to attribute TRUE value to the aforesaid "ACR Readiness" parameter, when both the "Engine Availability" and "ACR Helicopter Availability" signals assume TRUE value.

Otherwise, the FADEC 22—or the avionic system 30—is configured to attribute FALSE value to the aforesaid "ACR Readiness" parameter, when at least one of the "Engine Availability" and "ACR Helicopter Availability" signals assumes FALSE value.

The avionic system 30 is programmed to display the "ACR READY" signal on the display device 32, when the FADEC 22—or the avionic system 30—attributes TRUE value to the "ACR Readiness" parameter.

The avionic system 30 is also programmed to allow the pilot to actuate the ACR ARM command through the interface 34 and to place the ACR REQUEST command in the enabled position, when the FADEC 22 attributes TRUE value to the "ACR Readiness" parameter.

The avionic system 30, or alternatively the FADEC 22, are also programmed to make the actuation of the ACR ARM command ineffective, when the FADEC 22 does not make the "ACR Readiness" signal available.

The FADEC 22 is programmed to request, following the input of ACR ARM and ACR REQUEST commands, the system 100 to reconfigure itself by deactivating the generator 103 and to command the transition of the engines 10a, 10b from the nominal configuration to the ACR configuration.

Preferably, the FADEC 22 is programmed to verify the successful reconfiguration of the system 100 before causing the transition of the engines 10a, 10b from the nominal configuration to the ACR configuration. In particular, the aforesaid verification takes place by monitoring the current and electrical voltage values of the generator 103b provided by the avionic system 30 to the FADEC 22.

More precisely, the aforesaid first parameters are representative of the following conditions:
i) helicopter 1 is in a determined flight envelope necessary for the helicopter 1 to be able to operate in the ACR configuration;
ii) the helicopter 1 is in an area free from obstacles or flight restrictions;

iii) the angular speed of the rotor 3 lies in a determined interval of values necessary for the helicopter 1 to be able to operate in the ACR configuration;

iv) the indicated speed TAS is in a determined interval necessary for the helicopter 1 to be able to operate in the ACR configuration; and v) the ascent rate and the torque delivered by the engine 10b are in respective intervals ensuring reduced fuel consumption.

The avionic system 30 is programmed to compare the data detected by the sensors 21, 23 with the aforesaid intervals stored in the memory stage 37.

More precisely, the control unit 33 is programmed to attribute TRUE value to the "ACR Helicopter Availability" signal when the conditions previously identified as i), ii), iii), iv) and v) occur.

In particular, condition i) occurs when:
the external temperature OAT is comprised between a first design value and a second design value;
the pressure altitude is comprised between a third design value and a fourth design value;
the density altitude is comprised between a fifth value and a sixth value.

Condition ii) occurs when:
the height above ground level is preferably comprised between 50 and 1000 feet; and
the height above sea level is preferably comprised between 50 and 1000 feet.

Preferably, condition ii) is also verified when the altitude above the minimum flight level is preferably comprised between 50 and 1000 feet.

Condition iii) occurs when the angular speed Nr of the main rotor 3 is comprised between a seventh minimum value and an eighth maximum value, where the seventh value is preferably equal to between 0.85 and 1 times the nominal angular speed of the rotor 3 and the eighth value is preferably comprised between 1 and 1.15 times the aforesaid nominal angular speed and of the rotor 3.

The term "nominal angular speed" of the rotor 3 in the present description means the angular speed at which the rotor 3 is normally actuated during the operation of the helicopter 1.

Condition iv) occurs when the indicated speed IAS is comprised between a ninth value and a tenth value, where the ninth value is preferably comprised between 0.5 and 1.5 times the speed in level flight for which the minimum power is required at operating level and temperature and the tenth value is preferably comprised between 1 and 2.5 times the aforesaid speed in level flight for which minimum power is required.

Condition v) occurs when:
the torque delivered by the engines 10a, 10b is comprised between an eleventh value and a twelfth value, where the eleventh value is preferably comprised between 0.5 and 1 times the torque necessary for a straight level flight at the aforesaid speed for which the minimum power is required and the twelfth value is preferably comprised between 1 and 3 times the aforesaid torque necessary for a straight level flight at the aforesaid speed for which minimum power is required.

Preferably, condition v) is also verified when the variometric speed VS is comprised between a thirteenth value and a fourteenth value, where the thirteenth value is preferably comprised between 0.1 and 1 times the vertical speed of autorotation and the fourteenth value is comprised preferably between 0.1 and 1 times the maximum variometric speed at the aforesaid speed for which minimum power is required.

The aforesaid second parameters are also indicative of the fact that the sensors 21, 23 do not detect failures incompatible with the ACR configuration and that the operating conditions of the subsystems and plants are not incompatible with the ACR configuration. Examples of such failures incompatible with the ACR configuration are failures of on-board systems necessary to deliver electrical power to aircraft 1 or the functions of the Automatic Flight Control System—hereinafter referred to as AFCS—necessary to help the pilot.

Non-limiting examples of the failures identifiable by the avionic system 30 are as follows:
loss of the parameters indicative of whether the helicopter 1 is in the aforesaid flight envelope or not;
loss of the parameters identifying the operation of the electrical system 100 and of the engines 10a, 10b;
loss of the parameters relating to any faults of the engines 10a, 10b;
errors identifiable by the pilot in the parameters relating to engines 10a, 10b and to the electrical system 100, including false activations of warning signals relating to faults;
loss or incorrect supply, identifiable by the pilot, of parameters essential to the flight of the helicopter 1, for example relating to the hydraulic system or transmission 8;
generation of warning messages that require immediate intervention by the pilot; and
failures of the generator 102a which may produce the shutdown or loss of operating capacity.

It is important to underline that the expression "loss of parameters" used previously is used to indicate both the unavailability of such parameters on the display device 32 or in the FADEC 22 and the failure to detect such parameters by sensors 21, 23 and the failure in a unit interposed between the sensors 21, 23 and the display device 32 or in the FADEC 22.

The avionic system 30 is also programmed to command the FADEC 22 to transition the helicopter 1 between the nominal and ACR operating configurations.

In greater detail, the avionic system 30 is configured to command the transition of the helicopter 1 from the nominal operating configuration to the ACR operating configuration when both "ACR Helicopter Availability" and "ACR Readiness" parameters assume the TRUE value and when the ACR REQUEST command is in the activated position and the ACR ARM command has been previously actuated.

More precisely, during the transition of the helicopter 1 from the nominal operating configuration to the ACR operating configuration, the avionic system 30 preferably produces a time pause, ten seconds in the case illustrated, before placing the engine 10b in the condition in which it delivers power P4.

The avionic system 30 is programmed to:
command a reconfiguration step of the electrical system 100; and
command the FADEC 22 to perform a reconfiguration step of the engines 10a, 10b.

This reconfiguration of the engines 10a, 10b comprises, in particular:
the closure of the valves interposed on the air bleeding line of the compressor of the engine 10b;
the deactivation of the generator 102b actuated by the engine 10b; and the reconfiguration of the system 100 so that some of the electrical loads of the units 103b, 104b are supplied by the generator 102a connected to the engine 10a.

In greater detail, the electrical loads essential for the operability of the helicopter 1 of the units 103b are electrically connected to the generator 102a alone actuated by the engine 10a and the non-essential secondary electrical loads are deactivated or also at least partially electrically connected to the generator 102a alone, during this reconfiguration step.

Preferably, the aforesaid reconfiguration takes place automatically.

The display device 32 is also commanded by the avionic system 30 to display the ACR signal and to remove the 1(2) ACR TRANSITION signal, at the end of the aforesaid reconfiguration step.

Figure 4:
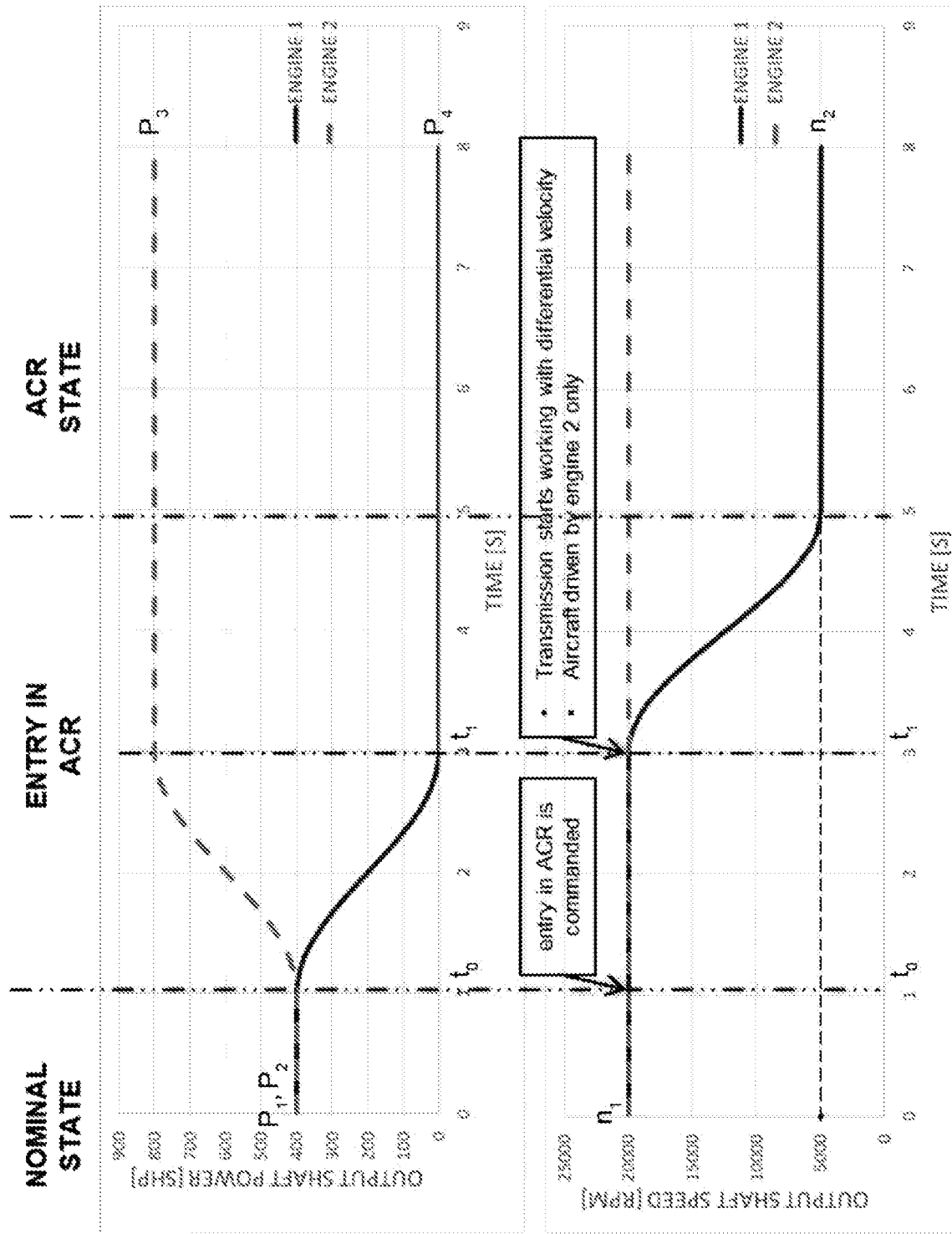
FIG. 4 illustrates the trend over time of the power delivered and the rotation speed of the outlet shaft of the turbo-shaft engines of the helicopter of FIG. 1, starting from a first flight condition in which both engines deliver power and during a transient of entry into a second flight condition in which one of the engines does not deliver engine power.

In greater detail, with reference to FIG. 4, the avionic system 30 is configured, starting from an instant t0 in which the reconfiguration of the system 100 has been completed and up to an instant t1 in which the transition from the nominal configuration to the ACR configuration has been completed, in order to request FADEC 22 to:

increase the power of the engine 10a from the value P1 to the value P3 reached at the instant t1;

decrease the power of the engine 10b from the value P2 to the value P4 reached at the instant t1; and keep the power of the engines 10a, 10b at the respective values P3, P4 following the instant t1 while the helicopter 1 is operating in the ACR configuration.

It is important to underline that the value P4 is greater than zero. Therefore, the engine 10b is turned on, when the helicopter 1 is operating in the ACR configuration.

With reference to FIG. 4, the avionic system 30 is also configured, starting from the instant t0 in which the angular speeds of the outlet shafts 11a, 11b are equal to each other and equal to the value n1, to request the FADEC 22 to:

decrease the angular speed of the outlet shaft 11b from the value n1 to the value n2 lower than the value n1, during the time interval comprised between the instants t0, t1;

keep the angular speed of the outlet shaft 11a at the value n1 during the time interval comprised between the instants t0, t1; and keep the angular speeds of the outlet shafts 11a, 11b at the respective values n1, n2 following the time instant t1.

In particular, following the instant t1, the free wheel 13 allows the disengagement between the outlet shaft 11b rotating at the angular speed n2 and the relative inlet shaft 12b to the transmission 8. In particular, the angular speed of the inlet shaft 12b is kept constant by the increase in driving torque provided by the inlet shaft 12a connected to the engine 10a.

Preferably, in the event that the ACR REQUEST command is placed in the enabled position when the helicopter 1 is outside the determined flight envelope, the avionic system 30 is configured to assist the crew in a manoeuvre that brings the helicopter 1 within the flight envelope.

In greater detail, the avionic system 30 is configured to:
compare the data detected by the sensors 21, 23 with the data stored in the memory stage 37 of the avionic system 30 itself;
identify the detected data that are outside the aforesaid envelope; and
indicate the aforesaid detected data to the crew by means of the display device 32.

Preferably, the control unit 33 of the avionic system 30 is programmed to:

continuously acquire from the sensors 21, 23 at least some parameters of the actual flight envelope of the helicopter 1 and monitor that at least these parameters of the actual flight envelope are within the determined envelope of determined flight, when the helicopter 1 is in the ACR configuration;
obtain a trend of said parameters; and
display on the display device 32 a warning message representative of the fact that the trend of said parameters produces the exit of the helicopter 1 from the aforesaid determined flight envelope.

In particular, the aforesaid trend is obtained constantly and for any operating configuration of the helicopter 1 itself.

In greater detail, the parameters of the actual flight envelope acquired by the avionic system 30 comprise at least the indicated speed IAS, the vertical speed VS and the altitude ALT.

More precisely, the avionic system 30 is programmed to detect a trend of the vertical speed and compare it with the ascent rate of the determined flight envelope.

The avionic system 30 is also programmed to detect the altitude trend, compare it with a trend obtainable from a database stored in the stage 37 and with the level of the determined flight envelope.

In particular, the aforesaid database comprises, for each latitude and longitude value, an altitude value above the sea.

The avionic system 30 is also configured to produce the transition of the helicopter 1 from the ACR operating configuration to the nominal operating configuration in the following circumstances:

to perform a commanded nominal emergency exit from the ACR operating configuration;
to perform a commanded emergency exit from the ACR configuration;
to perform an automatic emergency exit from the ACR configuration, when the "ACR Helicopter Availability" parameter assumes the FALSE value; and
to perform an automatic nominal exit, in case of minor anomalies of the helicopter 1 which do not require an automatic emergency exit.

Preferably, the commanded nominal commanded exit manoeuvre and the automatic nominal exit manoeuvre take place in longer times than the commanded emergency exit manoeuvres and the automatic emergency exit.

In greater detail, the control unit 33 of the avionic system 30 is programmed to request the FADEC 22 to perform a commanded nominal exit from the ACR configuration, when the crew moves the ACR REQUEST command to the deactivated position, in the ACR configuration of the helicopter.

Following the movement of the ACR REQUEST command to the deactivated position, the display device 32 is programmed to:
display the 1(2) ACR TRANSITION indication, following approval by the FADEC 22;
remove the ACR indication, once both engines 10a, 10b deliver the same powers P1, P2; and
remove the 1(2) ACR TRANSITION indication and display the ACR ARMED indication, once helicopter 1 is outside the ACR configuration.

Alternatively, following the movement of the ACR REQUEST command to the deactivated position, the display device 32 is programmed to remove the indication, once the engines 10a, 10b have the same outlet temperatures as the hot gases from the relative turbines.

The control unit 33 of the avionic system 30 is also programmed to perform the commanded emergency exit manoeuvre when the ACR ARM command is actuated with the helicopter 1 in the ACR operating configuration.

Under such conditions, the display device 32 is programmed to:
- display the 1(2) ACR TRANSITION indication following the confirmation by the FADEC 22 and during the re-configuration of the engines 10a, 10b;
- remove the ACR indication, once both engines 10a, 10b deliver the same powers P1, P2; and
- remove the 1(2) ACR TRANSITION indication and display the ACR READY indication, once helicopter 1 is outside the ACR configuration.

The display device 32 is also programmed during the automatic emergency exit from the ACR configuration to:
- display the 1(2) ACR TRANSITION indication;
- remove the ACR indication, once the engine 10b delivers the same power as the engine 10a; and
- remove the 1(2) ACR TRANSITION indication once the reconfiguration of the helicopter 1 has been completed.

The control unit 33 of the avionic system 30 is also programmed to perform the automatic nominal exit manoeuvre in case of minor anomalies of the helicopter 1 which do not require an automatic emergency exit.

During this automatic nominal exit manoeuvre, the display device 32 is programmed to:
- display the 1(2) ACR TRANSITION indication, following approval by the FADEC 22;
- remove the ACR indication, once both engines 10a, 10b deliver the same powers P1, P2;
- remove the 1(2) ACR TRANSITION indication and display the ACR ARMED indication, once helicopter 1 is outside the ACR configuration.

The avionic system 30 is also programmed to inhibit the ARM REQUEST function and attribute the FALSE value to the ACR ARM parameter, at the end of the completion of the automatic emergency exit manoeuvre.

In the conditions of automatic emergency exit, the avionic system 30 switches the ACR REQUEST command into the respective disabled position and inhibits the enabling thereof.

In the automatic emergency exit conditions, the avionic system 30 monitors the systems of the helicopter 1 and identifies any failures.

Figure 5:
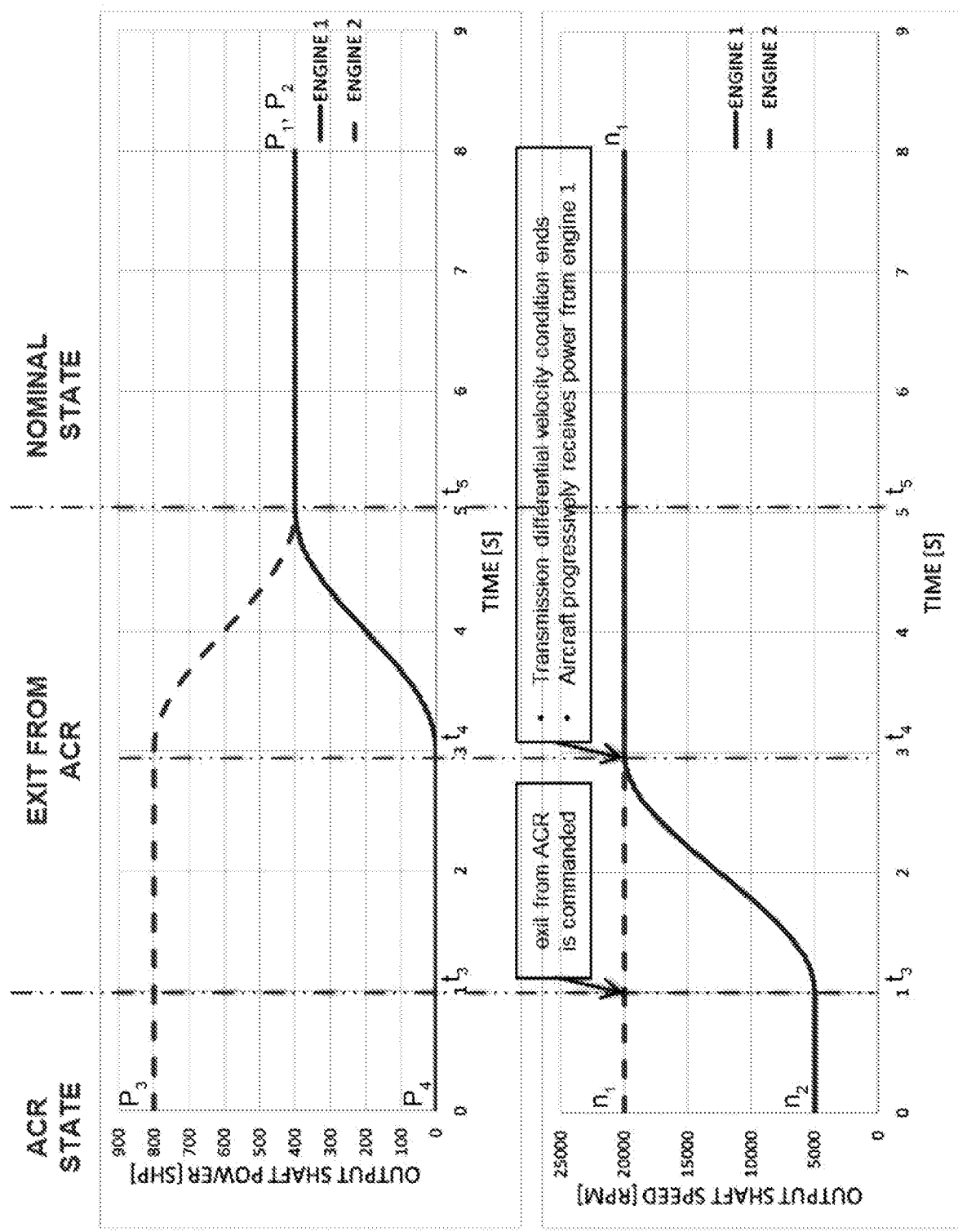
FIG. 5 illustrates the trend over time of the power delivered and the rotation speed of the outlet shaft of the turbo-shaft engines of the helicopter of FIG. 1, starting from the second flight condition and in a transient of exit from the second operating mode and of return to the first flight condition.

With reference to FIG. 5, the FADEC 22 is programmed, starting from an instant t3 in which the transition from the ACR configuration to the nominal configuration is commanded, to:
- increase the angular speed of the outlet shaft 11b from the value n2 to the value n1, during the time interval comprised between the instant t3 and an instant t4;
- keep the angular speed of the outlet shaft 11a at the value n1 during the time interval comprised between the instants t3, t4; and
- keep the angular speeds of the outlet shafts 11a, 11b at the respective values n1 equal to each other following the time instant t4.

In particular, in the time interval comprised between the time instants t3, t4, the engine 10b accelerates and brings the outlet shaft 11b to the same angular speed as the relative inlet shaft 12b to the transmission 8.

The FADEC 22 is also programmed to:
- decrease the power of the engine 10a from the value P3 to the value P1 in the time interval comprised between the time instant t4 and the time instant t5 in which the aforesaid transition has been completed; and
- increase the power of the engine 10b from the value P4 to the value P2 reached in the time interval comprised between the time instants t4, t5; and
- keep the power of the engines 10a, 10b at the respective values P1, P2 equal to each other following the instant t5 while the helicopter 1 is operating in the nominal configuration.

Preferably, the FADEC 22 is programmed during the transition of the helicopter 1 from the ACR operating configuration to the nominal operating configuration under the conditions of commanded nominal exit, automatic nominal exit, automatic emergency exit and commanded emergency exit in order to:
- produce respective time transients different from each other for reconfiguring the engines 10a, 10b;
- produce different time trends of the sliding speed between the wheels 16, 15 of the free wheels 13; and
- produce different power values made available by the engines 10a, 10b, once the respective free wheels 13 allow the angular rotation of the respective outlet shafts 11a, 11b and inlet shafts 12a, 12b.

The helicopter 1 also comprises an automatic AFCS flight control system programmed to:
- receive from the FADEC 22 information relating to the fact that the helicopter 1 is transitioning between the nominal configuration and the ACR configuration;
- evaluate any corrections for the flight controls 14a, 14b; and
- display the aforesaid corrections to the crew through the display device 32 or directly implement these corrections on the flight controls 14a, 14b in order to minimize perturbations in the trajectory and/or attitude of the helicopter 1 and in the angular speed of the rotor 3.

Preferably, the pilot or the AFCS flight control system acts on the flight controls 14a, 14b to perform a recovery manoeuvre in the event of a loss of power of the engine 10a when the helicopter 1 is in the ACR configuration.

This recovery manoeuvre is adapted to compensate for the loss of transient power in the time interval between when the engine 10a starts failing and when the engine 10b is able to deliver the power necessary to sustain the helicopter 1.

It is thus possible to keep the helicopter 1 within the relative operational and design limits during the aforesaid time interval.

Figure 6:
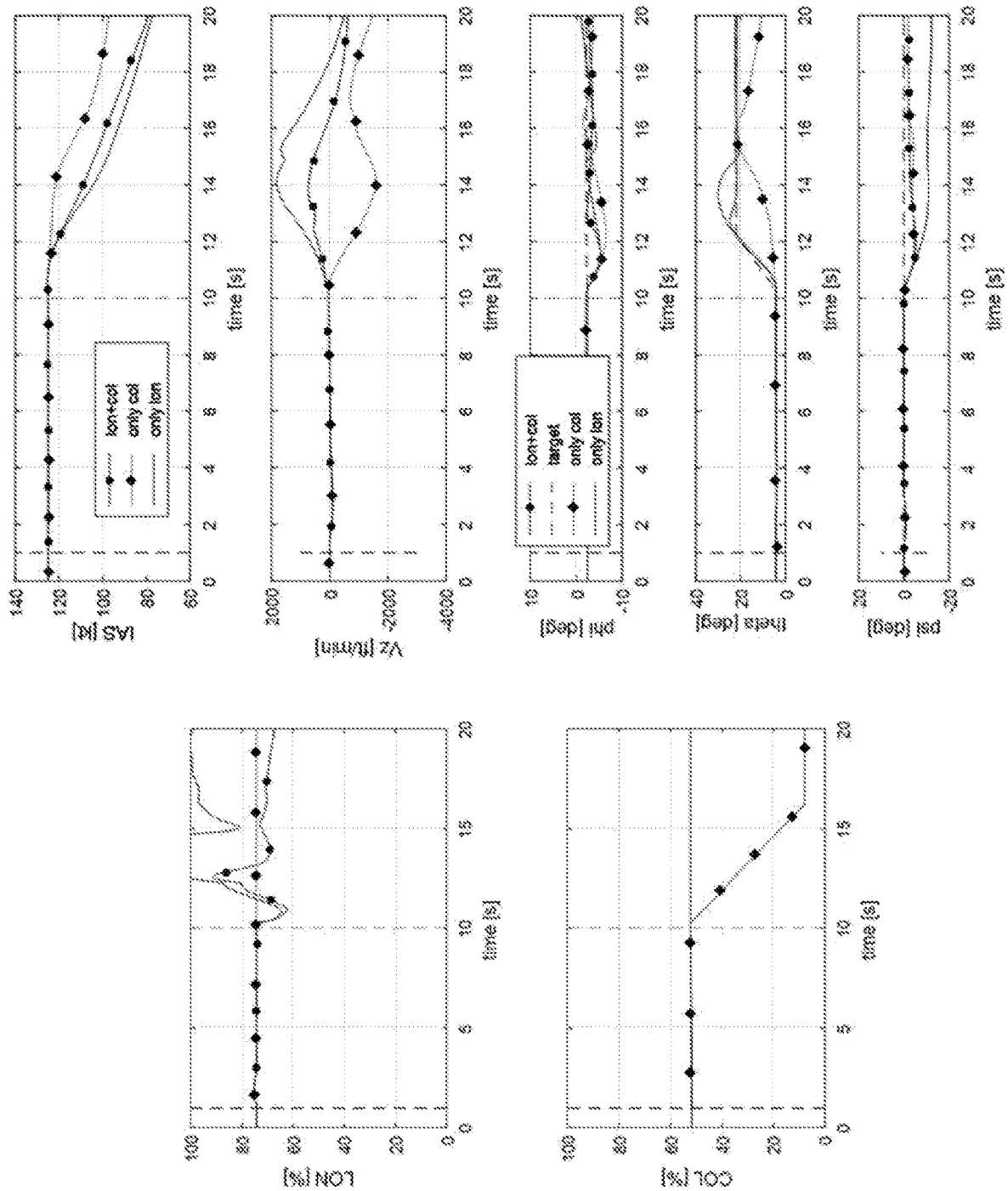
FIG. 6 illustrates the time trend of some flight commands during a recovery manoeuvre performed in the aforesaid second flight condition of the helicopter.

Preferably, the recovery manoeuvre is such as to produce the reduction in the level and speed of the helicopter 1 (FIG. 6). In particular, the recovery manoeuvre produces the arrangement of the helicopter 1 in a diving attitude and the acquisition of a vertical descent speed by reducing the pitch angles of the blades 9b by means of the flight control 14a. For example, the aforesaid recovery manoeuvre is an autorotation manoeuvre in an emergency condition.

When the helicopter 1 is in the ACR configuration, the free wheel 13 interposed between the outlet shaft 12b and the inlet shaft 11b bears the mechanical loads due to the relative sliding between the respective wheels 15, 16. More specifically, the difference in rotation speed between the wheels 16, 15 is chosen so as to reduce the local pressure loads on the components of the free wheel 13. Furthermore, the free wheel 13 is normally sized to permit these speed differences with a reduced impact on the fatigue life.

Figure 2:
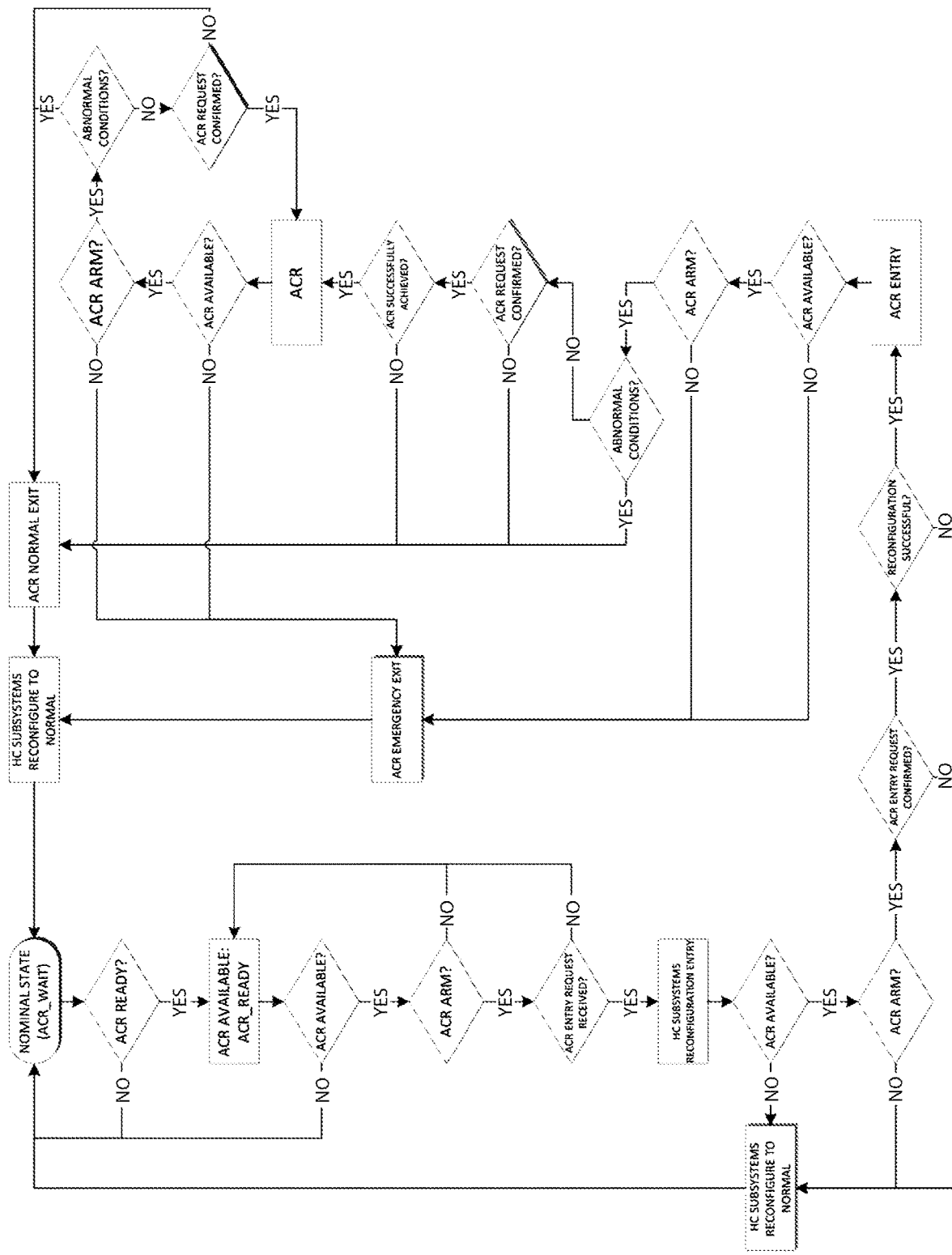
FIG. 2 is a flow chart which schematically illustrates a method for controlling an aircraft realised according to the dictates of the present invention.

The operation of the helicopter 1 is described starting from a condition in which helicopter 1 is in the nominal configuration and the ACR REQUEST command is in the disabled position (FIG. 2).

Under these conditions, the engines 10a, 10b deliver the respective powers P1, P2 and the outlet shafts 11a, 11b rotate at respective angular speeds n1 equal to each other integrally with the respective inlet shafts 12a, 12b of the transmission 8.

Both generators 102a, 102b are driven by respective engines 10a, 10b and electrically supply respective units 103a, 103b; 104a, 104b.

The control unit 33 of the avionic system 30 acquires from the sensors 21 the first parameters associated with the operating conditions of the helicopter 1 and the second parameters associated with any failures of the systems and equipment of the helicopter 1.

The control unit 33 compares these first parameters with the values stored in the stage 37.

In greater detail (FIG. 9), the control unit 33 of the avionic system 30 attributes TRUE or FALSE value to the "ACR Helicopter Availability" parameter, based on the first parameters detected by the sensors 21, on the content of the memory stage 37, and on any failures found by the avionic system 30.

In particular, the control unit 33 of the avionic system 30 attributes TRUE value to the "ACR Helicopter Availability" parameter when the helicopter 1, with the exception of the engine system 7, is in a condition to be operated in ACR configuration.

Even more precisely, the control unit 33 of the avionic system 30 attributes TRUE value to the "ACR Helicopter Availability" parameter, when all conditions i), ii), iii), iv) and v) occur and in the absence of significant failures in the helicopter systems 1.

On the contrary, the control unit 33 attributes FALSE value to the parameter "ACR Helicopter Availability" when the helicopter 1 cannot operate in the ACR configuration.

The FADEC 22 attributes TRUE value to the "Engine Availability" parameter if the engine system 7 is in a condition to operate in ACR configuration.

The FADEC 22, or alternatively the avionic system 30, attributes TRUE value to the "ACR Readiness" parameter to the avionic system 30, when both the "Engine Availability" and "ACR Helicopter Availability" signals assume TRUE value.

Consequently, the display device 32 displays the "ACR READY" parameter.

Under such conditions, the crew can request the transition to the ACR configuration by first actuating the ACR ARM command and then placing the ACR REQUEST command in the enabled position. Following the input of the ACR ARM and ACR REQUEST commands, the avionic system 30 produces the reconfiguration of the system 100 and requests the FADEC 22 to produce the transition of the engines 10a, 10b from the nominal configuration to the ACR configuration.

In particular, the system 100 is reconfigured, preferably automatically, so as to deactivate the generator 102b connected to the engine 10b and keep the generator 102a connected to the engine 10a active in order to supply the units 103a, 104a.

The essential electrical loads of the unit 103b are electrically connected to the generator 102a alone actuated by the engine 10a alone and the non-essential electrical loads are disabled during said reconfiguration step.

Preferably, the FADEC 22 verifies that the reconfiguration of the system 100 has occurred before causing the transition of the engines 10a, 10b from the nominal configuration to the ACR configuration.

In particular, during the reconfiguration step of the system 100, the display device 32 displays the 1(2) ACR TRANSITION indication.

During the reconfiguration step of the engines 10a, 10b, the display device 32 displays the ACR indication.

Preferably, the reconfiguration of the helicopter 1 begins after a time interval has elapsed since placing the ACR REQUEST command in the enabled position.

At the end of this time interval, the FADEC 22 reduces the fuel supply to the combustion chamber to the engine 10b and starts the reconfiguration of the engines 10a, 10b.

In greater detail, the FADEC 22, starting from the instant t0 (FIG. 4), in which the reconfiguration of the system 100 has been completed and up to an instant t1, in which the transition from the nominal configuration to the ACR configuration has been completed:
- increases the power of the engine 10a from the value P1 to the value P3 reached at the instant t1;
- decreases the power of the engine 10a from the value P2 to the value P4 reached at the instant t1; and
- keeps the power of the engines 10a, 10b at the respective values P3, P4 following the instant t1 while the helicopter 1 is operating in ACR configuration.

The FADEC 22, starting from the instant t0 in which the angular speeds of the outlet shafts 11a, 11b are equal to each other and equal to the value n1:
- decreases the angular speed of the outlet shaft 11b from the value n1 to the value n2 lower than the value n1, during the time interval comprised between the instants t0, t1;
- keeps the angular speed of the outlet shaft 11a at the value n1 during the time interval comprised between the instants t0, t1; and
- keeps the angular speeds of the outlet shafts 11a, 11b at the respective values n1, n2 following the time instant t1.

In particular, the inlet shaft 12a of the transmission 8 is driven in rotation by the outlet shaft 11a of the engine 10a delivering the power P1. The angular speed of the inlet shaft 12b is kept constant by the increase in driving torque provided by the inlet shaft 12a connected to the engine 10a.

Following the instant t1, the free wheel 13 allows the relative rotation with sliding between the inlet shaft 12b of the transmission 8 and the outlet shaft 11b of the engine 10b rotating at the angular speed n1.

The avionic system 30 continuously acquires the signals of the sensors 21, 23 and compares that the operating parameters continue to remain in the intervals stored in the stage 37.

If some of the operating parameters are outside the intervals stored in the stage 37 and/or failures incompatible with the ACR configuration are found, the system 100 and the engines 10a, 10b return to the nominal configuration.

When the helicopter 1 operates in the ACR configuration, the control unit 33 monitors that some parameters of the actual flight envelope of the helicopter 1 remain within the determined envelope of determined flight, and derives a trend of said parameters.

The display device 32 provides the pilot with a warning message relating to the fact that the trend of said parameters produces the exit of the helicopter 1 from the aforesaid determined flight envelope.

In case of loss of power of the engine 10a when the helicopter 1 is in the ACR configuration, the pilot or the AFCS flight control system act on the flight controls 14a, 14b to perform a recovery manoeuvre, in order to compensate for the loss of transient power in the time interval between when the engine 10a starts failing and when the engine 10b is able to deliver the power necessary to sustain the helicopter 1.

Preferably, the recovery manoeuvre produces the reduction in the level and speed of the helicopter 1 (FIG. 6). In particular, the recovery manoeuvre produces the arrangement of the helicopter 1 in a diving attitude and the acquisition of a vertical descent speed by reducing the pitch angles of the blades 9b by means of the flight control 14a.

The transition of the helicopter 1 from the ACR configuration to the nominal configuration takes place via a commanded nominal exit or a commanded emergency exit or an automatic emergency exit or an automatic nominal exit.

In particular, the crew produces the commanded nominal exit by placing the ACR REQUEST command in the disabled position.

In response to this deactivation of the ACR REQUEST command, the display device 32 displays the 1(2) ACR TRANSITION indication, following approval by the FADEC 22; removes the ACR signal, once both engines 10a, 10b deliver the same powers P1, P2; removes the 1(2) ACR TRANSITION indication; and displays the ACR ARMED indication once the helicopter 1 is in the nominal configuration.

The crew produces the commanded emergency exit by actuating the ACR ARM command.

In response to said actuation, the display device 32 displays the 1(2) ACR TRANSITION indication following the confirmation by the FADEC 22, removes the ACR indication, once both engines 10a, 10b deliver the same powers P1, P2; removes the 1(2) ACR TRANSITION indication once the helicopter 1 is outside the ACR configuration; and displays the ACR READY indication.

The avionic system 30 places the ACR REQUEST command in the deactivated position, thus preventing the possibility of returning to the ACR configuration.

The control unit 33, or alternatively the FADEC 22 itself, commands the FADEC 22 to produce the automatic emergency exit from the ACR configuration, when one of the "ACR Helicopter Availability" and "Engine Availability" parameters assumes FALSE value, that is, when at least one of the conditions i), ii), iii), iv), v) is not verified.

Under such circumstances, the display device 32 displays the 1(2) ACR TRANSITION indication, removes the ACR indication once the engine 10b delivers the same power as the engine 10a, and removes the 1(2) ACR TRANSITION indication once the reconfiguration of the helicopter 1 has been completed.

The control unit 33 resets the ACR armed state, does not display the ACR ARMED indication and places the ARM REQUEST command in the disabled position, at the end of the completion of the automatic emergency exit manoeuvre.

The display device 32 displays the 1(2) ACR TRANSITION indication during the transition from the ACR configuration to the nominal configuration of the helicopter 1 and removes the ACR indication at the end of the aforesaid transition.

Under the automatic emergency exit conditions, the sensors 21 recognize the presence of one or more failures incompatible with the ACR configuration, monitor the systems of the helicopter 1 with the exception of the engines 10a, 10b, and communicate this failure to the avionic system 30.

The FADEC 22 is commanded to implement a control law of the outlet shaft 11b of the engine 10b so as to ensure correct power values to the inlet shaft 12b of the transmission 8.

The avionic system 30 is also programmed to produce a rapid activation of the aids to the pilot to reconfigure the system 100.

The control unit 33 requests the FADEC 22 to perform the automatic nominal exit manoeuvre, in case of minor anomalies of the helicopter 1 that do not require an automatic emergency exit.

In greater detail, the control unit 33 also requests the FADEC 22, starting from the instant t3 in which the transition from the ACR configuration to the nominal configuration is commanded, to:
- increase the angular speed in the outlet shaft 11b from the value n2 to the value n1, during the time interval comprised between the instant t3 and an instant t4;
- keep the angular speed of the outlet shaft 11a at the value n1 during the time interval comprised between the instants t3, t4; and
- keep the angular speeds of the outlet shafts 11a, 11b at the respective values n1 equal to each other following the time instant t4.

In particular, in the time interval comprised between the time instants t3, t4, the engine 10b accelerates and brings the outlet shaft 11b to the same angular speed as the relative inlet shaft 12b to the transmission 8.

The control unit 33 also commands the FADEC 22 to:
- decrease the power of the engine 10a from the value P3 to the value P1 in the time interval comprised between the time instant t4 and the time instant t5 in which the aforesaid transition has been completed;
- increase the power of the engine 10a from the value P4 to the value P2 reached in the time interval comprised between the time instants t4, t5; and
- keep the power of the engines 10a, 10b at the respective values P1, P2 equal to each other following the instant t5 while the helicopter 1 is operating in the nominal configuration.

Depending on the type of manoeuvre for exiting the ACR configuration, the control unit 33 commands the FADEC 22 to produce different time trends of the sliding speed between the wheels 16, 15 of the free wheels 13, different time trends of the sliding speed between the wheels 16, 15 of the free wheels 13, and to produce different power values made available by the engines 10a, 10b once the respective free wheels 13 allow the angular rotation of the respective outlet shafts 11a, 11b and inlet shafts 12a, 12b.

For each of the aforesaid exit manoeuvres, the generator 102b connected to the engine 10b is activated again as well as the units 103b, 104b electrically connected to the generator 102b itself, at the end of the transition from the ACR configuration to the nominal configuration of the helicopter 1.

From an examination of the characteristics of the helicopter 1 according to the present invention, the advantages that it allows obtaining are evident.

In particular, the control unit 33 of the avionic system 30 is programmed to:
- acquire a series of parameters associated with the operating conditions of the helicopter 1; and
- enable the transition from the nominal configuration to the ACR configuration, when the aforesaid parameters assume respective first values.

In this way, it is possible to ensure that the helicopter 1 operates in the ACR configuration with lower specific fuel consumption, only when it is in a determined flight envelope and in the absence of failures of essential components of the helicopter 1 itself that affect the operativeness thereof in the ACR configuration.

This ensures that the engine system 7 can deliver maximum power when required by the operating conditions of the helicopter 1 and can minimize its consumption when permitted by the operating conditions of the helicopter 1 itself.

Thanks to the fact that the control unit 33 continuously acquires the parameters associated with the operating conditions of the helicopter 1, it is possible to perform an automatic emergency exit from the ACR configuration to the operating configuration, as soon as the helicopter 1 is outside the determined envelope of determined flight or there are failures of the helicopter 1.

When the helicopter 1 operates in the ACR configuration, the control unit 33 monitors that some parameters of the actual flight envelope of the helicopter 1 are within the determined envelope of determined flight, and derives a trend of these parameters.

The display device 32 provides the pilot with a warning message relating to the fact that the trend of said parameters produces the exit of the helicopter 1 from the aforesaid determined flight envelope.

It is thus possible to promptly inform the crew that helicopter 1 is approaching a flight envelope in which the ACR configuration is not allowed.

In case of loss of power of the engine 10a when the helicopter 1 is in the ACR configuration, the pilot or the AFCS flight control system act on the flight controls 14a, 14b to perform a recovery manoeuvre adapted to compensate for the transient power loss in the time interval between when the engine 10a starts failing and when the engine 10b is able to deliver the power necessary to sustain the helicopter 1.

It is thus possible to keep the helicopter 1 within the relative operational and design limits during the aforesaid time interval.

The control unit 33 of the avionic system 30 also allows:
a commanded nominal exit from the ACR operating configuration, should the crew consider it necessary; and/or
an automatic non-emergency exit from the ACR operating configuration in case of minor anomalies of the helicopter 1 that do not require an automatic emergency exit.

In greater detail, the commanded nominal exit manoeuvre can be requested by the crew even when the parameters assume the first values.

In this way, it is possible to exit the ACR configuration due to a need encountered by the crew, for example because the performance in this mode is not considered adequate for the specific flight conditions and the mission, or because anomalies not included among those automatically detected by the avionic system 30 requires the manual configuration to be restored.

It is thus possible to guarantee the maximum flexibility of use of the helicopter 1 along with the possibility of reducing consumption in the ACR configuration.

It is important to underline that in the ACR configuration, the engine 10b is not turned off, but delivers substantially nil power P2.

Consequently, thanks to the fact that the engine 10b remains active also in the ACR configuration, the time necessary to place the helicopter 1 in the nominal configuration in which the engine 10b delivers the power P2 is particularly reduced compared to known solutions in which one of the engines has been completely turned off.

In the ACR configuration of the helicopter 1, the outlet shaft 11b of the engine 10b rotates at an angular speed n1 lower than the angular speed n2 of the inlet shaft 12b of the transmission, thanks to the presence of the free wheel 13.

In other words, the free wheel 13 allows to support the mechanical loads due to the relative sliding between the wheel 16 and the wheel 15 which last over the entire time in which the helicopter 1 is in the ACR configuration.

In this way, the same free wheel 13 normally intended to allow the operation of the rotor 3 to be preserved for a short time in the event of exceptional failure of the engine 10b is also advantageously used to allow the operation of the rotor 3 in the ACR configuration over a prolonged period of time.

This is possible since the difference in rotation speed between the wheels 16, 15 is chosen in such a way as to reduce the local pressure loads on the components of the free wheel 13, and since the free wheel 13 is normally sized to allow such differences in speed with a reduced impact on fatigue life.

Finally, it is clear that modifications and variations can be made to the aircraft 1 previously described without thereby departing from the scope of protection of the present invention.

In particular, the aircraft capable of hovering could be a convertiplane instead of the helicopter 1.

More specifically, the aircraft capable of hovering could be a multirotor aircraft, for example with two coaxial rotors or of the intermeshing type.

Condition ii) could be verified not by the avionic system 30, but by the pilot under manual flight conditions.

The engines 10a, 10b could be heat engines different from the turbo-shaft engines or electric engines actuated by batteries or hybrid engines.

The invention claimed is:

1. A method for controlling a hovering aircraft which includes a first engine, a second engine, a rotor operatively connected to the first and second engines, and a transmission interposed between the first and second engine and the rotor, the transmission having a first inlet connected to the first engine and a second outlet coupled to the second engine the method comprising:
a) measuring a series of parameters associated with the operating conditions of said aircraft, the parameters including: i) an external temperature (OAT); ii) an external pressure, an external air density; iii and iv) heights of the aircraft above ground level and sea level; v) an angular speed of the rotor; vii) an indicated speed; viii) a torque delivered by the first and second engines; ix) an altitude above a minimum flight level; and x) a variometric speed (Vz),
b) determining whether the measured parameters indicate one or more of the following conditions: i) the external temperature (OAT) is between a first operating value and a second operating value; ii) the external pressure is between a third operating value and a fourth operating value; iii) the external air density is between a fifth operating value and a sixth operating value; iv) a height above ground level is between 50 and 1000 feet; v) the height above sea level is between 50 and 1000 feet; vi) the angular speed of the rotor is between 0.85 and 1.15 times a nominal angular speed; vii) the indicated speed (IAS) is between 0.5 and 2.5 times a first speed in level flight for which the minimum power at the torque delivered by the first and second engines level and operating temperature is required; viii) is between 0.5 and 3 times a first torque necessary for a straight level flight at the first speed; ix) an altitude above a minimum flight level is between 50 and 1000 feet; and a variometric speed (Vz) is between 0.1 and 1 times a vertical speed of autorotation and 0.1 and 1 times a maximum variometric speed at the first speed, c) when it is determined that the conditions i) through are ix) fulfilled:
  c1) transitioning operation of the aircraft from a first configuration in which both the first engine is operating with first power (P1) and the second engine is operating with second power (P2) to a second configuration in which the first engine is made to operate a third power (P3) greater than the first power (P1) and the second engine is made to operate at a nil power value (P4), wherein the third power being equal to the sum of first power (P1) and second power (P2);
d) when it is determined that conditions i) through ix) are not fulfilled and a difference between the measured parameters and at least one condition i) through ix) is greater than a minor anomaly, and the aircraft is operating in the second configuration:
  d1) performing a first automatic transition operating of the aircraft from the second configuration to the first configuration,
e) when it is determined that conditions i) through ix) are not fulfilled and a difference between the measured parameters and at least one condition i) through ix) is within a tolerance considered to minor anomaly, and the aircraft is operating in the second configuration:
  e1) performing a second automatic transition of the aircraft from said second configuration to the first configuration, wherein the second automatic transition is slower than the first automatic transition.

2. The method according to claim 1, characterized in that at least some of said parameters define a flight envelope of said aircraft (1); and/or at least further said parameters are indicative of a failure of said aircraft (1).

3. The method according to claim 1, characterized in that it comprises step iv) of preventing the transition of said aircraft (1) from said first configuration to said second configuration, when at least one of said parameters have a second value different from said first value; and/or characterized in that it comprises step vi) of performing a commanded emergency transition of said aircraft (1) from said second configuration to the first configuration, when said parameters have respective first values and following a first command.

4. The method according to claim 1, characterized in that it comprises the steps of:
  vii) producing a trend of at least some of said parameters, when said aircraft (1) is in said second configuration; and
  viii) generating a warning signal if said trend leads said at least some parameters to have second values different from said first values.

5. The method according to claim 1, characterized in that it comprises the steps:
  ix) detecting that said first engine (10a) starts failing;
  x) reducing the level and the vertical speed of said aircraft (1); and
  xi) increasing the power delivered by said second engine (10b).

6. The method according to claim 1, characterized in that it comprises step xv) of controlling said second engine (10b) so that the relative second outlet member (12) rotates at an angular speed greater than zero in said second configuration.

7. The method according to claim 1, characterized in that it comprises step xvi) producing a relative angular sliding between said second outlet member (11b) and said second inlet (12b) by means of a one-way clutch (13) when said aircraft (1) is in said second configuration and in case of failure of said second engine (10b);

said one-way clutch (13) comprising a first element (16) rotatable integrally with said relative second inlet (12b) and a second element (15) rotatable integrally with said second outlet shaft (11b); said clutch (13) rotationally decoupling said second inlet (12b) and second outlet shaft (11b), when said first element (16) rotates at a lower speed than said second element (15), and rotationally coupling said second inlet (12b) and second outlet shaft (11b) when said first and second element (16, 15) rotate at the same angular speed.

8. The method according to claim 7, characterized in that it comprises the steps of:
  xvii) producing different time trends of the sliding speed between said first element (16) and second element (15), according to the type of transition from said second configuration to said first configuration; and/or
  xviii) producing different power values (P1, P2) made available respectively by said first engine (10a) and second engine (10) once said one-way clutch (13) couples said second inlet (12b) and second outlet shaft (11b), according to the type of transition from said second configuration to said first configuration.

9. The method according to claim 1, characterized in that it comprises the steps of:
  xix) mechanically connecting a first electrical generator (102a) to said first outlet member (11a) of said first engine (10a);
  xx) electrically supplying first electrical loads (103a, 104a) with said first electrical generator (102a), when said aircraft (1) is in said first configuration;
  xxi) mechanically connecting a second electrical generator (102b) to said second outlet member (11b) of said second engine (10b);
  xxii) electrically supplying second electrical loads (103b, 104b) with said second electrical generator (102b), when said aircraft (1) is in said first configuration;
  xxiii) deactivating said second generator (102b) and the non-essential portion of said second electrical loads (103b, 104b), and supplying at least an essential portion of said second electrical loads with said first generator (102a), when said aircraft (1) is in said second configuration.

10. A hovering aircraft comprising:
a first engine;
a second engine;
at least one rotor operatively connected to the first engine and to the second engine;
a transmission interposed between the first and second engines and the rotor including a first inlet connected to the first engine and a second inlet connected to the second engine;
a plurality of sensors to measuring parameters associated with external conditions and conditions of components of the aircraft;
a control unit (30, 33, 22) configured to:
  a) receive a series of sensed parameters from the plurality of sensors, the parameters including: i) an external temperature (OAT); ii) an external pressure, an external air density; iii and iv) heights of the aircraft above ground level and sea level; v) an angular speed of the rotor; vii) an indicated speed; viii) a torque delivered by the first and second engines; ix) an altitude above a minimum flight level; and x) a variometric speed (Vz),
  b) determine whether the measured parameters indicate one or more of the following conditions: i) the external temperature (OAT) is between a first operating value and a second operating value; ii) the external pressure is between a third operating value and a fourth operating value; iii) the external air density is between a fifth operating value and a sixth operating value; iv) a height above ground level is between 50 and 1000 feet; v) the height above sea level is between 50 and 1000 feet; vi) the angular speed of the rotor is between 0.85 and 1.15 times a nominal angular speed; vii) the indicated speed (IAS) is between 0.5 and 2.5 times a first speed in level flight for which the minimum power at the torque delivered by the first and second engines level and operating temperature is required; viii) is between 0.5 and 3 times a first torque necessary for a straight level flight at the first speed; ix) an altitude above a minimum flight level is between 50 and 1000 feet; and a variometric speed (Vz) is between 0.1 and 1 times a vertical speed of autorotation and 0.1 and 1 times a maximum variometric speed at the first speed, c) when it is determined that the conditions i) through are ix) fulfilled:

c1) transition operation of the aircraft from a first configuration in which both the first engine is operating with first power (P1) and the second engine is operating with second power (P2) to a second configuration in which the first engine is made to operate a third power (P3) greater than the first power (P1) and the second engine is made to operate at a nil power value (P4), wherein the third power being equal to the sum of first power (P1) and second power (P2);

d) when it is determined that conditions i) through ix) are not fulfilled and a difference between the measured parameters and at least one condition i) through ix) is greater than a minor anomaly, and the aircraft is operating in the second configuration:

d1) perform a first automatic transition operating of the aircraft from the second configuration to the first configuration, e) when it is determined that conditions i) through ix) are not fulfilled and a difference between the measured parameters and at least one condition i) through ix) is within a tolerance considered to minor anomaly, and the aircraft is operating in the second configuration:

e1) perform a second automatic transition of the aircraft from said second configuration to the first configuration, wherein the second automatic transition is slower than the first automatic transition.

11. The aircraft according to claim 10, characterized in that it comprises:

a plurality of sensors (21, 23) adapted to detect first said parameters defining a flight envelope of said aircraft (1) and second said parameters indicative of a failure of said aircraft (1), and functionally connected with said control unit (30, 33); and a FADEC (22) configured to command said first and second engine (10a, 10b) and commanded by said control unit (30, 33).

12. The aircraft according to claim 10, characterized in that said control unit (30, 33) comprises a storage stage (37) of the said first values; and/or characterized in that it comprises a display device (32) commanded by said control unit (30, 32, 33) and configured to display to the crew:

a first signal (ACR READY) representative of the fact that said aircraft (1) including said first and second engine (10a, 10b) is in a condition to be operated in ACR configuration; and/or a second signal (ACR ARMED) representative of the fact that said transition from said first to the second configuration is enabled; and/or a third signal (ACR) representative of the fact that said aircraft (1) operates, in use, in said second configuration.

\* \* \* \* \*